Oct. 25, 1927.  
D. BONETTO  
1,646,723  
FLUID MOTOR  
Filed Oct. 19, 1925  
2 Sheets-Sheet 1

Inventor  
Domenico Bonetto.  
By Cushman Bryant & Darby  
Attorneys

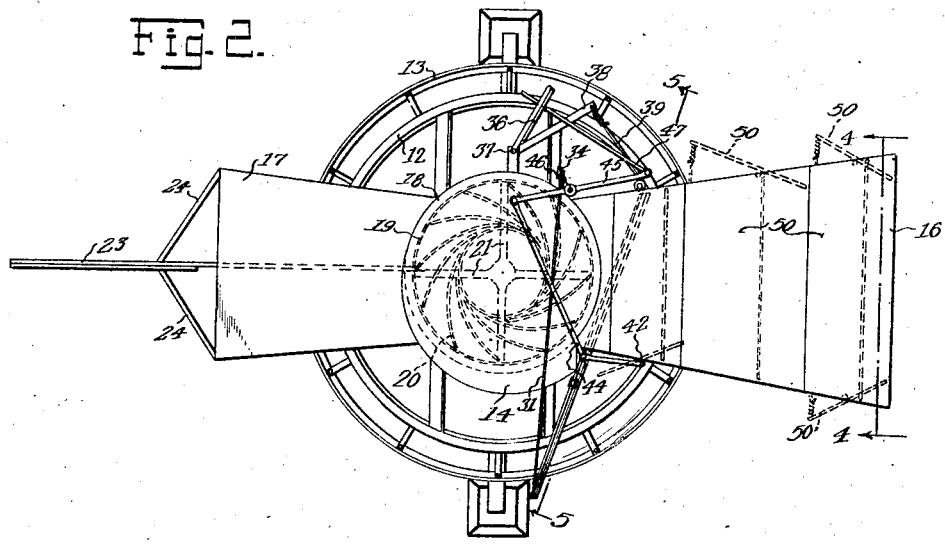

Patented Oct. 25, 1927.

1,646,723

UNITED STATES PATENT OFFICE.

DOMENICO BONETTO, OF ST. LOUIS, MISSOURI.

FLUID MOTOR.

Application filed October 19, 1925. Serial No. 63,449.

The present invention relates to apparatus for deriving power from a fluid, such as air, and relates more particularly to means for collecting the fluid and regulating its velocity when passing the motor element of the device.

The invention is an improvement upon the fluid motor of my Patent 1,471,095, granted October 16, 1923, and has as its object the provision of automatically operable mechanism for regulating the flow of air to the rotor which is positioned between a funnel-shaped receiving device and a funnel-shaped discharge device, rigidly connected together and having their enlarged ends facing in diametrically opposite directions.

A further object of the invention is to provide means for discharging from the receiving device, air which may enter when the valve which closes communication between the device and the rotor is partially closed, such mechanism being preferably regulatable automatically.

A still further object of the invention is to provide a funnel-shaped receiving device which will open automatically when the pressure of the fluid increases to a point where the normal discharge or by-pass opening will not suffice for its elimination from the funnel.

Figure 1:
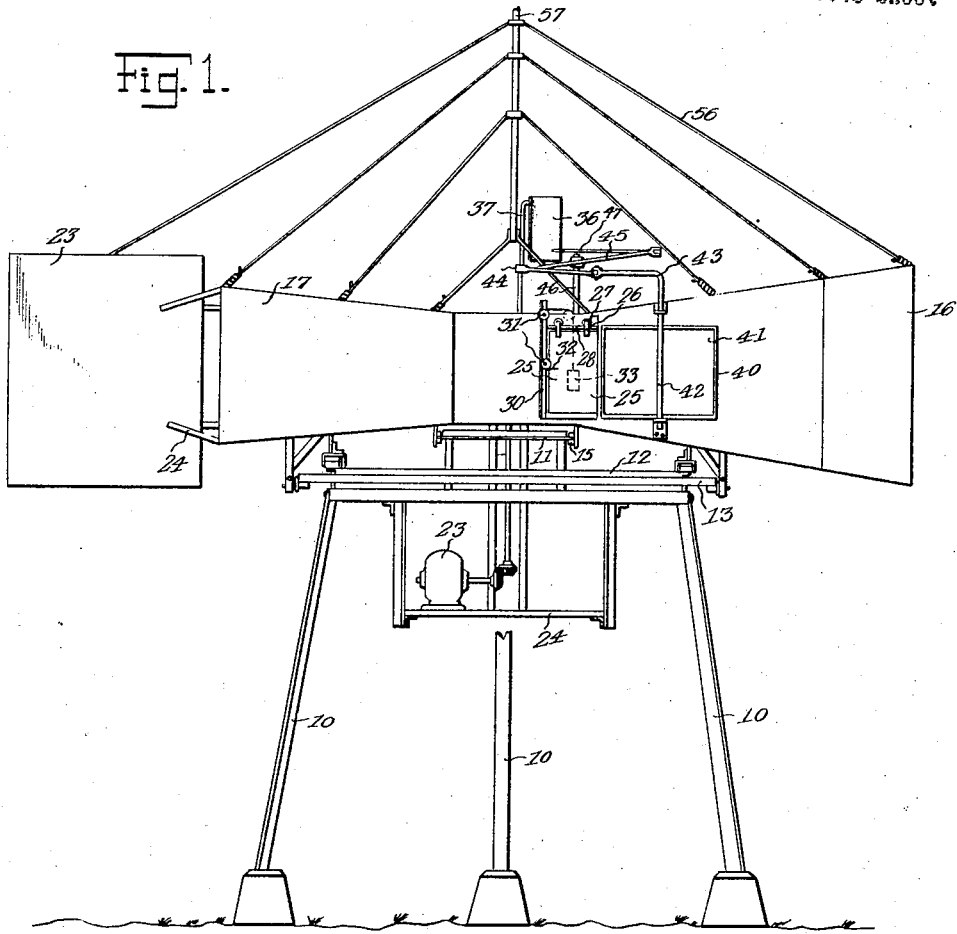
Figure 5:
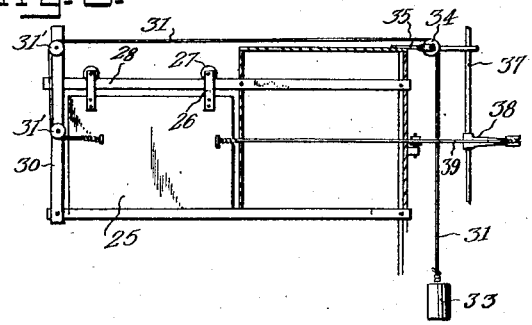

Other objects of the invention will become clear as the description proceeds in conjunction with the preferred embodiment illustrated in the accompanying drawings, wherein:

Figure 1 is a side elevational view.
Figure 2 is a top plan.
Figure 3 is a longitudinal section.
Figure 4 is a cross section on substantially the line 4—4 of Figure 2.
Figure 5 is a vertical section on substantially the line 5—5 of Figure 2.

Referring to the drawings for a more detailed description, 10 indicates the uprights of a suitable support carrying at its upper end circular concentric tracks 11, 12, 13, which support the casing 14 by means of rollers 15, which follow the tracks.

The casing comprises, generally, a funnel shaped receiving device 16, and a funnel shaped discharge device 17, the smaller ends of which are united by a central casing portion 18, which serves to house a rotor or motor element 19, having a plurality of vanes 20. The rotor is mounted to revolve about a vertical axis and comprises a pair of spiders 21 mounted upon a shaft 22 which extends downwardly for the transmission of power to any suitable driven element, such, for example, as the generator 23, mounted upon the platform 24, which is suspended from the support. The rotor is arranged between the smaller ends of the receiving funnel 16, and the discharge funnel 17, so as to receive air entering the receiving funnel and discharge the same through the funnel 17. It will be observed that the mouths or larger ends of the funnels extend in diametrically opposite directions and in order that the casing may be automatically adjusted so that the receiving funnel faces the direction from which the air travels, a tail vane 23 is carried by bars 24, adjacent the end of the funnel 17.

The mechanism above described corresponds generally to that disclosed in my patent above referred to. For the purpose of regulating the admission of driving fluid from the funnel 16 to the rotor, a transversely slidable gate or valve 25 is supported at its upper end by means of hangers 26 which carry rollers 27, on a track 28, which extends transversely of the funnel adjacent the rotor. It will be observed (Fig. 2) that the track is inclined at substantially a tangent to the circumference of the rotor, so that the air will be admitted from the funnel to the rotor at the desired angle. At its lower end the valve is guided by means of a channel 29, and both the channel and track 26 extend outwardly (Fig. 1) and are connected to an upright 30 which supports pulleys 31 over which are trained a rope 32 connected at one end to the door 25 and carrying at its other end a weight 33 which serves to maintain the valve withdrawn from the funnel. The rope 31 extends upwardly over the pulleys 31' across the top of the funnel (Fig. 5) and over a pulley 34, supported by means of a bracket 35. The valve is moved to closed position by means of an emergency vane 36 mounted upon a vertical shaft 37, which carries at its lower end an outwardly extending arm 38 (Fig. 2) this arm being connected to a cable 39 which extends through an opening in the side of the funnel 16, and is connected to the valve at 25. It will be observed that the vane normally faces the same direction as the mouth of the funnel 16, and should it be desirable to close the valve somewhat to maintain the rotor at a uniform speed, the vane will actuate the valve through its shaft 37 and cable connection 39. When the wind dies down, the valve will be opened by means of the return weight 33, connected therewith through cable 31.

When the door or valve 25 is drawn into the funnel, it will be desirable to discharge or by-pass a portion of the air which enters the funnel, and for this purpose, a port 40 is located in the side of the funnel, and is controlled by a valve 41 rotatably mounted upon a vertical shaft 42. The upper end of the shaft 42 is bent laterally at 43 and is connected by means of a link 44 with a lever 45 pivotally mounted at 46. The opposite end of the lever is connected by means of a push rod or link 47 with the vane 36, and it will be understood that connections above described are such that as the vane moves the valve 25 into the funnel 16, it opens the discharge or by-pass valve 41 thereby permitting a portion of the air which enters the funnel to be discharged laterally.

The valves 25 and 41 with the operating mechanism described will take care of the normal air power and maintain the motor or rotor in operation at a uniform speed. However, it is desirable to provide means for accommodating the device to extreme winds or cyclones which would quickly disorganize the structure. For this purpose, the top, bottom and sides of the funnel 16 are constructed so that they may quickly open under extreme wind pressure. For this purpose, doors 50 are pivotally mounted in the sides, bottom and top, and are connected by means of cable 51, (Fig. 4) with weights 52, the ropes being trained over pulleys 53 carried by vertical supports 54 arranged at horizontally spaced points within the funnel. The weights 52 normally maintain the doors 50 closed, and they will remain in this position during the ordinary operation of the apparatus hereinbefore described. However, should a cyclone or other high wind occur, the force of the air will open the doors 50 as well as the discharge port valve 41, it being understood that the valve 25 will, at the same time, be closed by vane 36.

The entire casing may be reinforced by means of guy ropes 56, extending outwardly and downwardly from a central mast 57, positioned above the casing and supported from the same.

Obviously the invention is not limited to the details of structure illustrated and described, since many of the features are adaptable to apparatus which are substantially different from that disclosed. For example, the control valve 25 and the by-pass valve 41 might be used independently of a discharge funnel 17 or even of a receiving device of the character shown. Moreover, it should be understood that the invention is not limited to commercial machines, since devices of this character may be made up in comparatively small sizes for use as toys.

I claim:

1. In an apparatus of the class described, a funnel-shaped receiving device, a rotor immediately adjacent said device and to which the latter directs fluid adapted to drive the rotor, a valve for controlling the admission of fluid from the receiving device to the rotor, means for automatically controlling said valve, and a second valve in advance of said first valve for permitting discharge of fluid from said receiving device adapted to be automatically opened when the fluid pressure increases beyond a predetermined point.

2. In an apparatus of the class described, a funnel-shaped receiving device, a rotor immediately adjacent said device and to which the latter directs fluid adapted to drive the rotor, a valve for controlling passage of fluid from the receiving device to the rotor, means for automatically controlling said valve, a second valve in advance of the first named valve for permitting discharge of fluid from said receiving device when said valve is closed, a plurality of closure members in the sides of said receiving device adapted to be automatically opened when the fluid pressure increases beyond a predetermined point, and gravity controlled means for normally maintaining said closure members closed.

3. In an apparatus of the class described, a fluid impelled rotor, self-adjusting means adjacent the rotor to receive and discharge the fluid by which the rotor is adapted to be driven, said means comprising a receiving device, a valve for controlling passage of fluid from the receiving device to the rotor, a vane located exteriorly of the device and connected to said valve for controlling its position, a second valve located in advance of the first valve for permitting discharge of fluid from said receiving device in advance of said first valve, and operating means connecting said second valve with said vane on the exterior of the device.

4. In an apparatus of the class described, a fluid impelled rotor, self-adjusting means adjacent the rotor to receive and discharge the fluid by which the rotor is adapted to be driven, said means comprising a receiving device, a rectilinearly movable valve movable transversely of the device at an angle less than 90° to the longitudinal center of said receiving device, means for automatically controlling said valve, a second valve in advance of the first valve and arranged at the base of said angle made by the first valve and the receiving device for permitting discharge of fluid from said receiving device, and means connecting said second valve with said means for automatically controlling the first valve.

5. In an apparatus of the class described, a fluid impelled rotor, a self-adjusting receiving device adjacent said rotor to receive and direct the fluid by which the rotor is driven, said receiving device including a casing having one or more of its entire walls made up of a plurality of movable closure members, gravity controlled means for normally maintaining said closure means in a common plane and closed to form said wall, and said members being moved to open positions by excessive fluid pressure which overcomes said gravity controlled means.

6. In an apparatus of the class described, a fluid impelled rotor, self-adjusting means immediately adjacent the rotor to receive and discharge the fluid by which the rotor is adapted to be driven, said means comprising a receiving device adapted to direct the fluid to said rotor, a valve for controlling communication between said receiving device and the rotor, and an emergency vane pivotally mounted exteriorly of said receiving device and including a crank, means connecting said crank with said valve for operating the same, a second valve plate disposed in advance of the first valve and including a crank, a lever fulcrumed between its ends, and means connecting the ends of said lever with said emergency vane and the crank of the second valve plate for controlling it simultaneously with said first mentioned valve.

In testimony whereof I have hereunto set my hand.

DOMENICO BONETTO.